Figure 1:
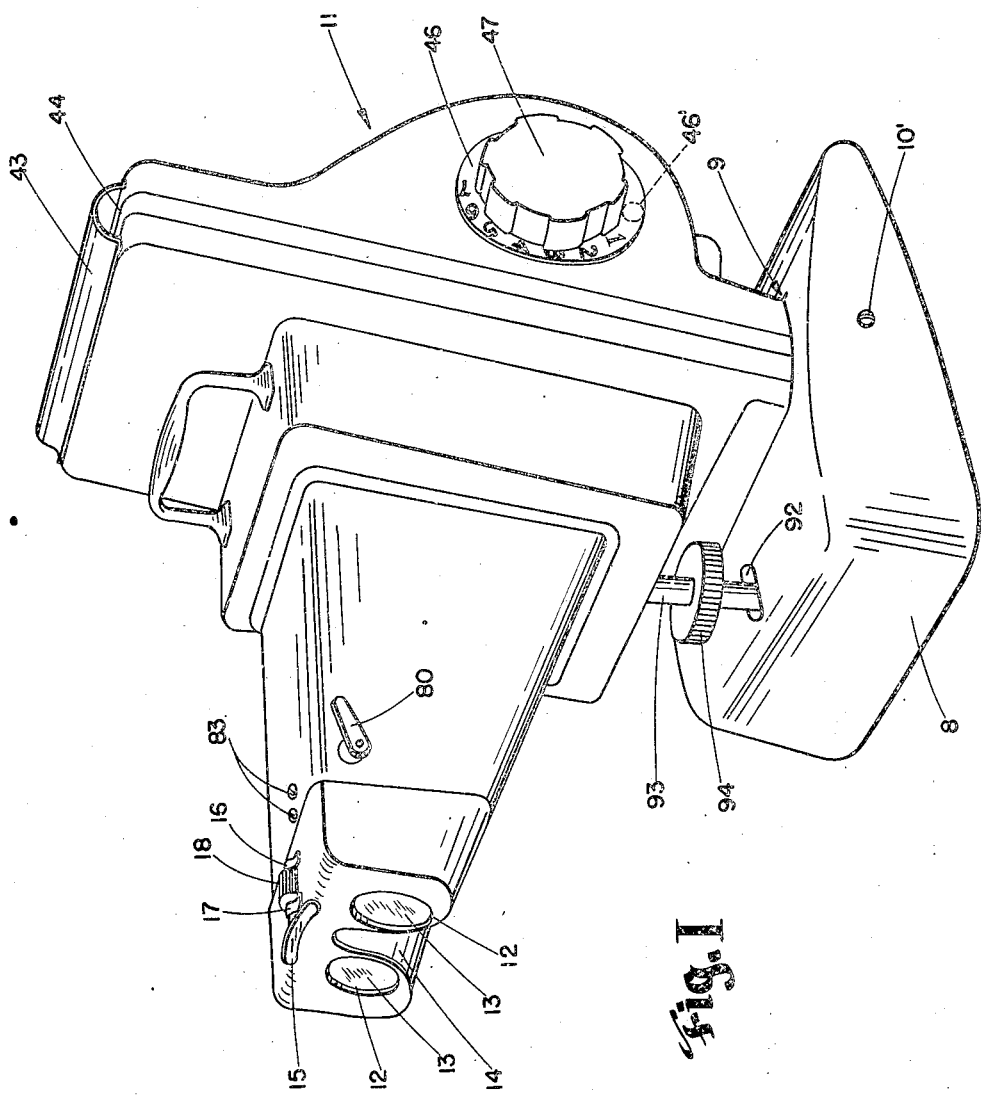

Sept. 13, 1949. C. A. ELLIS 2,481,582
EYE TESTING DEVICE HAVING SELF CONTAINED MEANS FOR
CHECKING BOTH FAR AND NEAR VISION DEFICIENCIES
Filed Oct. 19, 1945 5 Sheets-Sheet 2
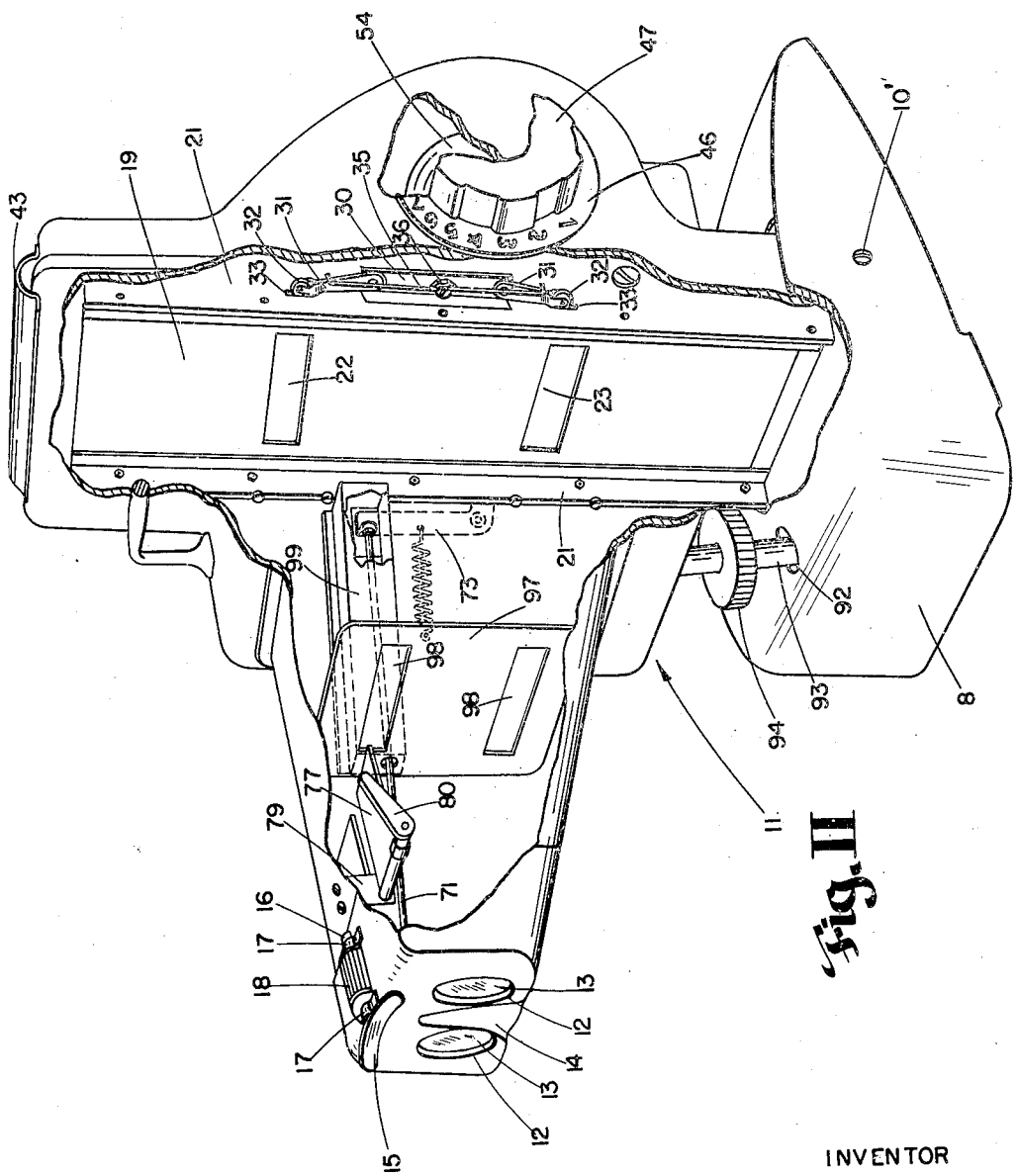
Fig. II
INVENTOR
CHARLES A. ELLIS
BY
Louis L. Gagnon
ATTORNEY

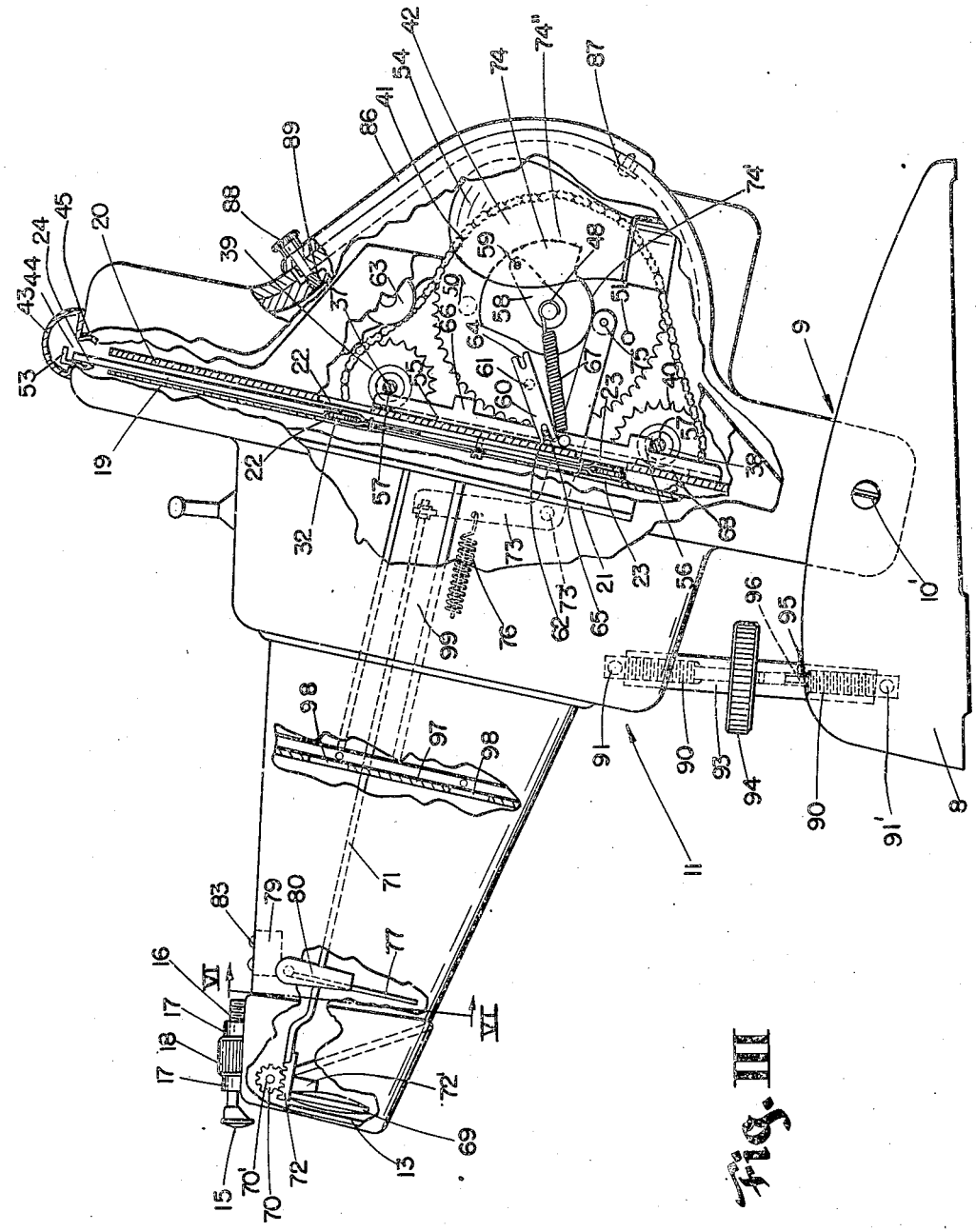
Fig. III

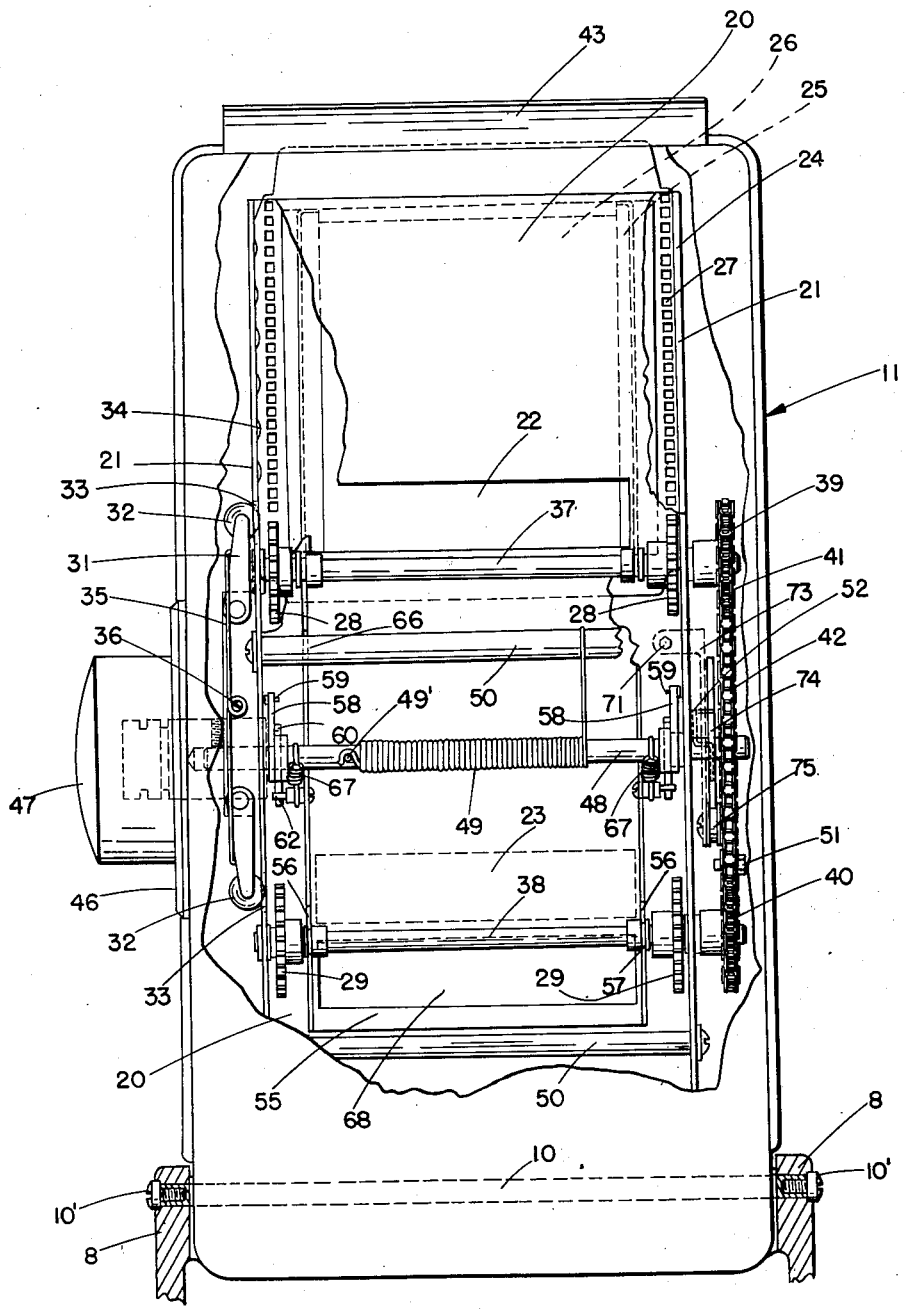
Fig. IV

Sept. 13, 1949.  C. A. ELLIS  2,481,582
EYE TESTING DEVICE HAVING SELF CONTAINED MEANS FOR
CHECKING BOTH FAR AND NEAR VISION DEFICIENCIES
Filed Oct. 19, 1945  5 Sheets-Sheet 5
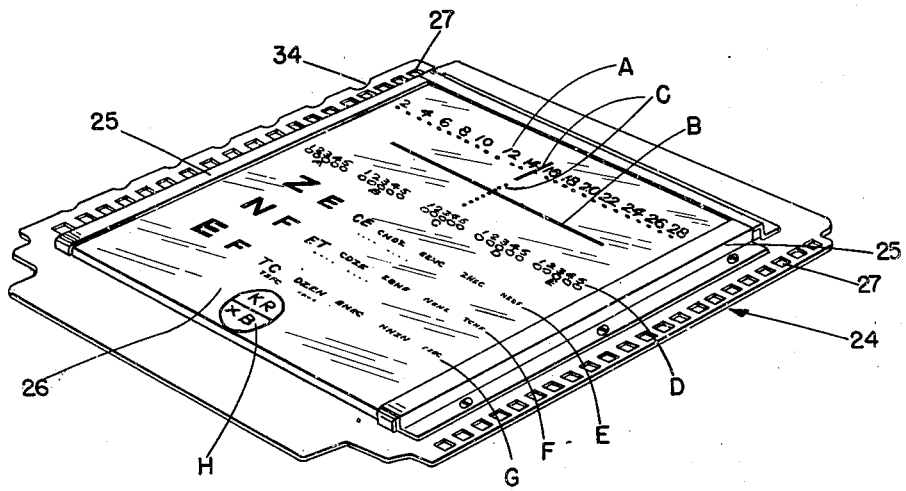
Fig. V
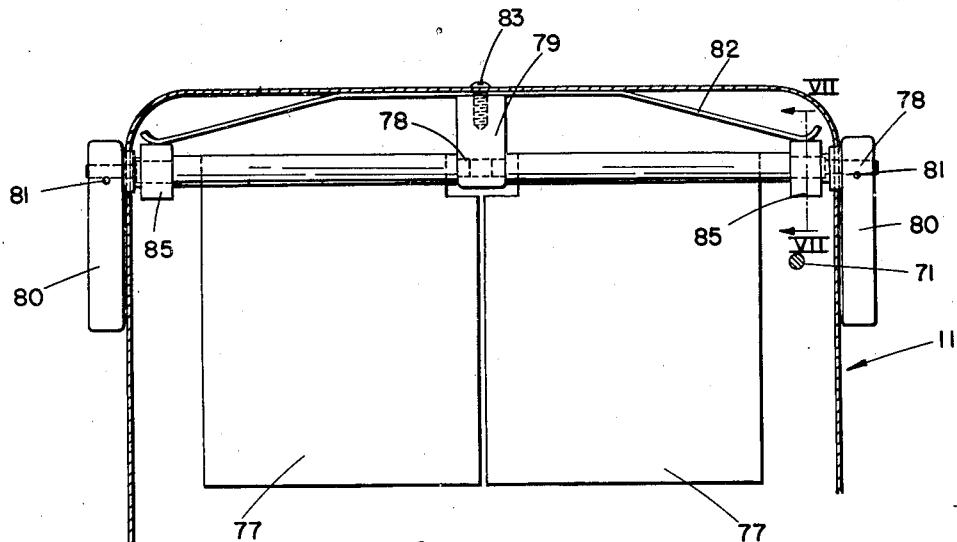
Fig. VI
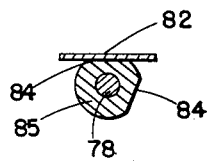
Fig. VII
INVENTOR.
CHARLES A. ELLIS
BY
*Louis L. Gagnon*
ATTORNEY Patented Sept. 13, 1949

2,481,582

UNITED STATES PATENT OFFICE 2,481,582

EYE TESTING DEVICE HAVING SELF-CONTAINED MEANS FOR CHECKING BOTH FAR AND NEAR VISION DEFICIENCIES

Charles A. Ellis, Southbridge, Mass., assignor to American Optical Company, Southbridge, Mass., a voluntary association of Massachusetts Application October 19, 1945, Serial No. 623,211

10 Claims. (Cl. 88—20)

1

This invention relates to vision deficiency checking devices and relates more particularly to improved means for performing visual classification tests.

A principal object of the invention is to provide in a compact and simple form a vision checking device having self-contained means for examining both near and far vision.

Another object of the invention is to provide a vision checking device adapted to quickly and efficiently carry out visual classification tests under standardized conditions and with a minimum of distraction to the individual under check.

Another object is to provide means for checking the binocular and single binocular vision of an individual or individuals for detecting existing visual errors and the characteristics thereof for both near and distant vision.

Another object is to provide a device by which visual defects of different characteristics may be readily detected whereby a subsequent more accurate test may be made to determine the extent of the visual defects.

Another object is to provide a device known commonly in the art as a screening device for quickly and easily performing visual classification tests and which may be employed by individuals requiring little or no skill in the art of eye examining.

Another object is to provide a device of the above character embodying visual test means located in a single plane at a distance from the eyes commonly known in the art as the reading distance and having indicia thereon movable to a position substantially in line with straight-ahead vision of the eyes as when looking at a distance and having means in alignment with said straight-ahead vision for effectively positioning the test means at infinity, the said test means possessing test indicia of different characteristics for performing the various usual known visual tests and being movable to an additional position known in the art is the reading position for performing similar tests at a near vision position.

A further object is to provide automatic means in a vision checking device for shifting from far vision checking means to near vision checking means, which means will not substantially distract the individual's consciousness during the vision check.

Still another object is to provide a vision checking instrument adapted to subject an individual

2 to far and near vision checks successively with a minimum amount of distraction.

A still further object is to provide binocular vision checking means in a vision checking device of the above character comprising a pair of polarizing lenses whose axes are angled perpendicular relative to each other for viewing a polarized test chart having portions of the test objects angled to correspond to the related angled positions of each lens.

Other objects and advantages of the invention will become and be apparent from the following description taken in connection with the accompanying drawings and it is to be understood that many changes or modifications may be made both in the details of construction and arrangement of parts shown and described without departing from the spirit of the invention as expressed in the accompanying claims.

I, therefore, do not wish to be limited to the exact arrangement of parts and details shown and described, as the preferred form only has been shown by way of illustration.

Referring to the drawings:

Fig. I is a perspective view of the device embodying the invention;

Fig. II is a view generally similar to Fig. I with parts cut away and omitted for clarity of illustration;

Fig. III is a side elevational view with portions of the casing cut away and with portions of the internal mechanism in section;

Fig. IV is a rear elevational view of the device partly in section and with a portion of the casing cut away;

Fig. V is a view of the chart bearing device;

Fig. VI is an enlarged fragmentary sectional view taken as on line VI—VI of Fig. III showing the occluder; and Fig. VII is a sectional view taken along line VII—VII of Fig. VI.

Within recent years there has arisen a need in industry, schools and other institutions for a simple, compact and portable eye examining device or unit having self-contained standardized lighting conditions and means whereby visual examinations might be conducted without regard to external conditions of lighting or the like. The characteristics of the device are such that it would not be so much one for determining the corrective lens as required by a patient but are for determining whether correction is desirable or necessary, thus more a visual screener or classifier.

Referring more particularly to the drawings in which like characters of reference designate like parts throughout the several views, the device embodying the invention comprises a base 8 having a slotted portion 9 in which is pivotally mounted, by means of a bar 10, the casing enclosing the device generally indicated as 11, said bar 10 being secured in position on the base by screws or the like 10'.

One end of the casing 11 is provided with a pair of sight openings 12 in each of which is seated a light polarizing lens 13. The axis of polarization of one lens is perpendicular to the axis of the other. A cut-out portion or recess 14 is provided for the nose of the individual undergoing the test. Also directly over the sight openings 12 and nose cut-out portion 14 is a brow rest 15 carried by a bar member 16. The bar 16 is slidably mounted in bearing housings 17 secured to the casing 11. The said bar member 16 is provided with an intermediate threaded portion on which a thumb nut 18 having a threaded bore is mounted. Thus, a simple device is provided for regulating the distance of the individual's eyes from the sight openings 12 by rotation of the nut 18.

Positioned inwardly of the casing and spaced a considerable distance from the sight openings 12, there is provided a pair of vertically spaced walls 19 and 20 of opaque material each having a set of aligned openings 22 and 23 therein. The walls 19 and 20 are secured between side supporting plates 21 which are in turn supported in spaced parallel relation with the inner side walls of casing 11.

A chart holder, such as shown in Fig. V, is supported for upward and downward movement between the plates 19 and 20 as best illustrated in Fig. III. This chart holder embodies a suitable framing 25 in which is secured a plate of glass 26 under which any desirable chart may be supported.

Although any desirable layout of test chart may be used, a chart such as shown in Fig. V having portions thereof formed to be rendered visible by light polarized in one meridian for one eye and other portions thereof formed to be visible by polarized light to the other eye is employed. For example, the line of numerals A and a parallel line B are light polarized so as to be visible by one eye only and the normally related line of dots and full line section C is light polarized so as to be visible by the other eye. Of course, it is understood that suitable light polarizing means 13 oriented in normal relation to each other are positioned before the eyes and that the eyes are viewing the chart through said light polarizing means. The line of grouped indicia D are arranged for binocular vision with one of the circles of each of the respective groups being stereoscopically visible whereby the said circle appears as being in a different plane than the remainder of the circles. The line of indicia E embodies test characters in graded sizes for binocular visual acuity tests and are simultaneously visible to the respective eyes. The line of indicia F is visible only to the left eye while the line of indicia G is visible only to the right eye whereby separate tests for visual acuity of the respective eyes may be obtained. The test means H is in the form of a circle divided into two sections, one having the letters KR and the other XB therein with the respective sections being polarized with their axes of polarization in normal relation to each other whereby one of the sections is visible to one eye and the other is visible to the other eye while the outer circular contour is visible to both eyes and provides peripheral fusable means for normally locating the two halves KR and XB in proper associated relation with each other. The main plate portion of the chart holder 24 is provided adjacent the opposed sides thereof with a plurality of perforations 27 adapted to be engaged by the sprockets 28 and 29, the sprockets 28 being adapted to engage the chart holder when in its raised position and with the sprocket 29 being adapted to engage the chart holder when in its lowermost position. It is through the rotation of these sprockets that the different lines of test means of a chart such as shown in Fig. V may be aligned with the respective openings 22 and 23 and will be more clearly defined hereinafter.

One of the side edges of the chart holder is provided with a plurality of spaced indentations 34 adapted to index with suitable indexing wheels 32 carried by arms 31 pivotally attached to a support 30 carried by the adjacent side supporting plate 21. The said side supporting plates 21 are provided with slots 33, see Figs. II and IV, through which the indexing wheels 32 are adapted to extend for engagement with the indentations 34. The said wheels are resiliently urged into engagement with the indentations 34 by means of a spring member 35 secured by a screw 36 to the member 30. The spring member is provided with ends shaped to hook over the respective pivot arms 31 for normally urging the said arms in the direction of the slots 33.

Movement of the chart holder 24, therefore, upwardly or downwardly will, by means of the sprockets 28 and 29 as the case may be, cause the indentations 34 to be successively indexed with the indexing wheels and will simultaneously automatically position the respective lines of test indicia of the test chart to be successively or selectively aligned with the openings 22 or 23, as the case may be.

Referring more particularly to Fig. IV, it is to be noted that the pair of sprockets 28 are secured to an axle 37 and the pair of sprockets 29 are secured to an axle 38. Each of the respective axles 37 and 38 are provided with a sprocket 39 and 40 which are adapted to impart a rotary movement to the sprockets 28 and 29 through movement of a continuous chain 41 driven by a main sprocket 42. A tensioned roller 63, see Fig. III, may be provided for taking up the slack in the chain 41. The main sprocket 42 is mounted on the shaft 48 having hand engagement means 47 on the opposed end thereof by means of which the shaft 48 may be rotated.

The chart holder 24 is positioned between the spaced walls 19 and 20 with its rack portions engaging the sprockets 28, through an opening 44 formed in the top of the casing 11. The opening 44 is provided with a friction cover 43 which may be removed for the insertion of the chart holder and which is provided with resilient portions 45 for holding the cover in position. The indexing wheel 32 engaging the indentations 34 will aid in controlling the movement of the chart holder to selective positions when the sprockets 28 are rotated through the chain 41, the main sprocket 42 and the hand wheel 47. This arrangement provides means whereby the different lines of indicia may be first selectively aligned with the openings 22 in the upper portion of the spaced walls 19 and 20.

Continued movement of the chart holder in a downward direction will cause the rack portions thereof to move from engagement with the sprockets 28 into engagement with the sprockets 29 whereby the respective lines of test means on the test chart may be successively aligned with the openings 23 in the lower portions of the spaced walls 19 and 20. The alignment of the respective test means of the chart with the first-mentioned openings 22 is for the distance test and the alignment of the respective test indicia of the chart 24 with the openings 23 is for the near vision test which will be more clearly outlined hereinafter.

A stop 53 carried by the cover 43 is provided to limit the upward movement of the chart holder 24 when said chart holder is moved in an upward direction.

The shaft 48 on which the main sprocket 42 is mounted is provided with a coil spring fitted thereover having one of its ends secured to a cross arm and its opposed end secured to the shaft 48 as indicated at 49'. The coil spring 49, during the movement of the various lines of indicia successively into alignment with the openings 22 in the spaced walls 19 and 20 and through continued movement of said respectivey lines of indicia successively into alignment with the openings 23 in said spaced walls 19 and 20, will cause the spring 49 to have a winding action imparted thereto which, when there is no chart holder 24 in the device, will tend to return and retain the hand wheel 47 and its associated parts in zero or initial starting position thereby insuring that the corresponding numerals on the dials and the correlated lines of test indicia on the chart will be in proper registry with each other when a chart is positioned in the device and the indicia moved successively in alignment with the respective openings 22 and 23. The dial is formed of transparent material and the indicia thereon is adapted to register with an opening 46' formed in the side wall of the casing and through which light from a source of illumination 54 internally of said casing is adapted to be emitted and thereby determines which of the test indicia are in alignment with the respective openings 22 and 23.

To limit the downward movement of the chart holder, the main sprocket 42 is provided with a stop pin or the like 51 which is adapted to engage with a suitable stop member 52, see Fig. IV, carried by the plate 21.

It is particularly pointed out that the support means for the test indicia is translucent and that the light polarizing effect is obtained by shining a light through the test means. This result is brought about by placing a suitable source of illumination 54 internally of the casing and in the rear of the test chart.

As stated above, the opening 22 is employed for successive alignment of the test indicia therewith in performing the distance test and the opening 23 is utilized for forming the near vision test. In order to permit the light from the light source 54 to shine through only one of the said openings during the respective tests, there is provided an occluding block 55 slideably supported on the wall 20 so that the said occluding block may be moved upwardly or downwardly and is so arranged that when light is permitted to shine through one of said openings, the light will be prevented from passing through the other. For example, during the far vision test the occluding block 55 is in a downward position controlled by the provision of stop means 56 on the occluder which is adapted to engage a roller 57 carried by the axle 38. By reference to Fig. III, it will be noted that when the stop means 56 engages the stop roll 57 carried by the axle 38, the occluder 55 is moved clear of the opening 22 and a portion thereof will overlie the opening 23 to prevent light from passing therethrough. When moved in an upward direction, the occluder block will be moved in a position to overlie the opening 22 and is in turn provided with an opening 68 adapted to be aligned with the opening 23 to permit the passing of light therethrough. The upward movement of the occluder block is limited by stop means 66 engaging the stop rolls 57 carried by the axle 37.

To bring about this movement to the block, there is provided a pair of arms 58 mounted on the shaft 48, best shown in Figs. III and IV, each having a pin 59 adjacent the free ends thereof adapted to engage with the slotted ends 64 of a pair of pivoted members 60 pivotally secured to the supporting plate 21 by suitable pivotal means 61. The pivot members 60, opposed to the slotted ends 64, are provided with similarly formed slotted ends 65 adapted to engage pins 62 carried by the occluder block 55. It has been previously stated above that by movement of the hand wheel 47, the main sprocket 42 carried by the shaft 48 is rotated. During this rotation of the shaft 48, the arm 58 carried thereby will simultaneously be caused to rotate and upon rotation of the sprocket 42 an amount sufficient to move the respective lines of indicia throughout their range of completion of alignment with the opening 22, the pins 59 will engage the slotted end 64 of the pivoted member 60 and will cause the slide block to be moved upwardly to prevent the light from passing through the opening 22 and to cause the opening 68 to align with the openings 23 to allow light to shine therethrough.

To retain the occluder block in its adjusted position, there is provided a coil spring 67 secured adjacent one of its ends to the shaft 48 and adjacent its opposed end to the occluder block. This spring in one position of adjustment lies to one side of the pivot 61 so that its tension pull will tend to hold the occluder block in that particular direction of movement and is adapted, upon movement of the pivoted member 60 in the opposite direction, to be moved to the opposed side of the pivot 61 whereby its tension pull will hold the occluder block in that position of adjustment. The stops 56 and 66 respectively limit the extent of movement of the occluder block. The occluder block is mounted to move in a guided path in the respective grooved rolls 57 and is held in smooth operative relation therewith by the tension of the spring 67.

It has been described that when the chart holder has been moved successively throughout its test range from its extreme uppermost position to its extreme lowermost position, the coil spring 49 is caused to wind up and will thereafter tend to unwind and return the dial and its associated parts to zero position. This return movement will cause the arm 58 to be moved in a reversed direction to that described above whereupon the pins 59 engaging the slotted ends 64 will cause the occular block to be lowered so that the tests may be repeated.

In performing the distance test, it is essential that the test means be effectively positioned at infinity. To bring about this result, there is provided a pair of plus lenses 69, having base in prism, one alignable in each of the respective sight openings 12. These lenses are mounted in the holder which is pivotally connected at 70' to the side walls of the casing adjacent the sight openings. The pivot means for the lens holder is provided with a pinion gear 70 which is adapted to mesh with a rack 72 carried by the end of the rod 71. The rod 71 is attached adjacent its opposed end to a bell crank 73 pivotally supported at 73'. The rack 72 is slideably supported by suitable slide blocks or the like 72'. The end of the bell crank opposed to the end attached to the rod 71 is provided with a cam engagement roller 75 adapted to engage a cam member 74 carried by the shaft 48. The cam roller 75 is urged into constant engagement with the edge surface of the cam member 74 by means of a spring member 76 attached at one of its ends to the bell crank and its opposed end to the outer wall of the casing 11. The cam 74 is provided with a portion of relatively short radius 74' and a portion of relatively long radius 74''. The portion of relatively short radius is adapted to position the rack 72 which is in mesh with the pinion gear 70 at such a location as to cause the lenses 69 to be positioned in the line of sight of the individual under test. This is for the distant vision testing and the dwell area portion 74' is such as to permit the lenses 69 to remain in this position throughout the cycle of the distant vision tests. As the shaft 48 is rotated beyond the last distance test means and before the first near test appears cam 74 turns through an angle sufficient to bring surface 74'' into engagement with follower roll 75 and will rock the bell crank on its pivot 73' and will move the pinion gear 70 an amount sufficient to raise and hold the lenses 69 out of the line of sight of the individual under test. This movement takes place simultaneously to the movement of the occluder block 65 as set forth above so that the light from the light source 54 can be directed through the aligned openings 68 and 23 for the near vision tests.

Referring particularly to Figs. VI and VII, to provide for monocular examing, occluding means are furnished which comprises a pair of occluders 77 mounted upon individual pivot shafts 78 journalled at one end in an opening in the case 11 and at the other end in a block 79. Handles 80 are provided for their operation and are secured to the shafts 78 by screw means or the like 81. To control the position of the respective occluders 77 in or out of the line of vision, a flat spring 82 secured to the block 79 by a screw 83 is provided. The spring has its end portions positioned to rest upon the flattened portions 84 of cam blocks 85 secured to shafts 78. The flattened portions 84 correspond to the desired adjusted positions of the occluders 77.

To provide means for replacing bulbs 54 or otherwise viewing the internal parts of the instrument, a removable cover 86, in the rear of the instrument, is provided having a screw and washer arrangement 87 at one end adapted to form a lip over the wall of the case 11 and having a thumb screw 88 at its other end adapted to engage in a threaded opening 89 formed in the case 11.

Simple means have also been provided for adjusting the level of the sight apertures 12 relative to the eyes of the individual under examination. Two threaded members 90 are provided, one being pivotally secured by a screw, pin or the like 91 to the case 11, and the other being similarly pivoted to the base 8 by a screw, pin or the like 91'. One of the threaded members 90 is provided with threads running clockwise and the other with threads running counterclockwise. By this means, a sleeve 93 with a knurled thumbpiece 94 having its internal portion similarly threaded will upon turning extend or retract the threaded portions 90 in relation to each other.

To limit the extension and retraction movement, one of the threaded portions 90 is provided with a reduced extension having a circumferential groove 96 therein. The sleeve 93 is provided with a screw member 95 having an end portion extending within the circumferential groove for limiting the longitudinal movement of the threaded member 90 in a direction inwardly and outwardly of the sleeve.

To reduce reflections and limit any extraneous light from entering the eyes of the individual under examination other than that coming through the target area being viewed, which is of especial importance during phoria examination, a baffle 97 is provided between the wall 19 and the sight apertures 12. This baffle is secured to the walls of the casing 11 and has a pair of openings 98 along the line of vision and proportioned in shape and size so as to permit substantially only the target area to be viewed. In addition, a portion of the rod 71 is enclosed in a box-like member 99. The interior of the device is preferably painted a dull black.

The operation of the device is substantially as follows: With the chart illustrated in Fig. V, it is possible to determine the presence of errors of phoria, visual acuity, binocularly or single binocularly and deficiencies as to stereopsis, fusion etc.

The device, as previously stated, is not designed with the thought of determining any particular deficiency but is more of a screening device for affording ease of detection of one or more of such deficiencies.

The particular chart employed depends upon the type of check being made and it is to be understood that several different charts may be provided depending upon just what type of screening is intended.

The individual being examined is seated before the instrument with his eyes aligned with the sight openings and a proper adjustment of the forehead rest and the instrument is made for greatest comfort to the individual.

The chart to be employed is inserted in the instrument as previously described. The progressive screening tests are made by moving the particular test indicia into alignment with the opening 22. The individual under test makes his report to the examiner at each individual exhibition of the test indicia and the test indicia being viewed is determined by the dial 46. During the test, the individual is first tested as to his distance vision by looking through the lenses 69 which effectively positioned the test indicia at infinity. The test is then repeated for the reading distance by exhibiting each line of test indicia successively in the opening 23 and carried out in the manner previously described. That is, the hand wheel 47 is merely rotated an amount sufficient to bring about the shift of the test chart from its uppermost position to the lowermost position. This shift will automatically move the occluder block 55 upwardly to cover the opening 22 and to allow light to pass through the openings 68 and 23 and will simultaneously cause the cam 74 to raise the lenses 69 out of alignment with the sight openings. At the completion of the screening, the examiner merely reverses the movement of the hand wheel 47 to return the chart to its initial position of insertion. This movement will simultaneously move the occluder block downwardly and the dial to its zero setting. The spring 49, tending to urge the shaft 48 in the direction of unwinding of said spring will retain the hand wheel 47 and the associate mechanism at a zero setting. By noting from the dial the particular test indicia which is being exhibited and by having previous knowledge of what the individual should report for normal vision, the examiner is able to quickly and easily determine if the individual is deficient for any of the particular tests. Such individuals are then cautioned to have their eyes examined by a competent oculist or optometrist.

It is particularly pointed out that with the present invention, the distance vision tests are carried out with the eyes of the individual looking in the direction normal for distant vision and the reading tests are carried out with the eyes downward as in reading with the test means positioned at the required distances for each test. The reading test is a continuation of the distance test and the individual under test is subjected to a minimum distraction.

The characteristics of the visual test means are such that the individual has no direct knowledge of just what particular test is being performed and each test relies upon the individual's report of just what he sees. If his report does not coincide with what should be reported, the examiner immediately knows that there is a certain visual deficiency present.

In view of the foregoing description, it will be seen that simple, efficient and economical means have been provided for accomplishing all of the objects and advantages of the invention.

Having described my invention, I claim:

1. An eye testing device of the character described comprising a hollow chamber having sight openings therein adjacent one end and having a wall portion spaced from the sight openings, said wall portion having a plurality of openings therein, carrier means for alternately positioning a succession of test target means in each of said openings in the wall portion, lens means movable into the line of vision between the sight openings and the wall portion for effectively projecting the test target means visible therethrough at infinity, said target means being positioned for near vision when the lens means are not in said line of vision, mounting means movably supporting the lens means on the device, and control means operably connecting said lens means with said carrier means for moving said lens means into the line of vision when test target means are positioned in one of said openings and for moving said lens means out of the line of vision when the test target means are not positioned in said opening of the wall portion.

2. An eye testing device of the character described comprising a hollow chamber having sight openings therein adjacent one end and having a wall portion spaced from the sight openings, said wall portion having a pair of spaced openings therein, and carrier means for alternately positioning a succession of test target means in each opening in the wall portion, occluding means operably associated with the carrier means for occluding the opening in said wall portion in which the test target means are not being positioned, lens means movable into the line of vision between the sight openings and the wall portion for effectively projecting the test target means visible therethrough at infinity, said test target means being positioned for near vision when the lens means are not in said line of vision, mounting means for movably supporting the lens means on the device, and control means operably connecting said lens means with said carrier means for moving said lens means into the line of vision when test target means are positioned in one of said openings and for moving said lens means out of the line of vision when the test target means are not positioned in said opening of the wall portion.

3. An eye testing device of the character described comprising a hollow chamber having sight openings therein adjacent one end and having a wall portion spaced from the sight openings, said wall portion having a pair of openings therein, and carrier means for alternately positioning a succession of test target means in each of said openings in the wall portion, illuminating means disposed rearwardly of the wall portion and occluding means operably associated with the carrier means for occluding the opening in the wall portion on which the test target means are momentarily not being positioned, lens means movable into the line of vision between the sight openings and the wall portion for effectively projecting the test target means visible therethrough at infinity, said target means being positioned for near vision when the lens means are not in the line of vision, supporting means movably supporting the lens means on the device, and control means operably connecting said lens means with said carrier means for moving said lens means into the line of vision when test target means are positioned in one of said openings and for moving said lens means out of the line of vision when the test target means are not positioned in said opening of the wall portion.

4. An eye testing device of the character described comprising a hollow chamber having a pair of sight openings therein adjacent one end and having a wall portion spaced from the sight openings, said wall portion having a plurality of openings therein, and carrier means for alternately positioning a succession of test target means of light transmittable material in each opening in the wall portion, means disposed rearwardly of said test target means for directing light through said test target means, lens means movable into the line of vision between the sight openings and the wall portion for effectively projecting the test target means visible therethrough at infinity, said target means being positioned for near vision when the lens means are not in said line of vision, supporting means movably supporting the lens means on the device, and control means operably connecting said lens means with said carrier means for moving said lens means into the line of vision when test target means are positioned in one of said openings and for moving said lens means out of the line of vision when the test target means are not positioned in said opening of the wall portion, said sight openings each having a light polarizing lens therein having their axis of polarization in substantially normal relation to the axis of polarization of the other lens, and with the test target means embodying portions for polarizing light transmitted therethrough along the axis of polarization of one of said polarizing lenses and embodying other portions for polarizing light transmitted therethrough along the axis of polarization of the other of said polarizing lenses.

5. An eye testing device of the character described comprising a hollow chamber having sight openings therein adjacent one end and having a pair of aperture portions spaced from the sight openings, said apertured portions lying in a single plane and one spaced above the other, the upper apertured portion being disposed for substantially straight ahead vision, and the lower apertured portion being disposed susbtantially at the position for reading vision, the distance of the sight openings from said lower apertured portion being equal substantially to the normal reading distance of the individuals undergoing the test, and carrier means for alternately passing before each apertured portion a chart member having a succession of test target means thereon, occluding means operatively associated with said carrier means for occluding the apertured portion before which the chart means is not being passed, lens means movable into the line of vision between the sight openings and the upper apertured portion so as to effectively project the test target means visible therethrough at infinity, supporting means for movably supporting the lens means on the device, and control means operably connecting said lens means with said carrier means for moving said lens means into the line of vision when the chart means is passed before the upper apertured portion and for moving said lens means out of the line of vision when the chart member is being passed before the lower apertured portion.

6. An eye testing device of the character described, comprising a carrier member spaced from and located to be viewed by the eyes of an individual when under test, said carrier member having test targets positioned thereon, movable occluding means on the device for causing the test targets on said carrier member to become alternately visible at a pair of spaced locations lying in a plane substantially normal to the line of vision from the eyes of said individual under test when viewing the test targets, means positionable into said line of vision for projecting an image of the targets to infinity, said targets being positioned for near vision when said image projecting means are not in said line of vision, mounting means movably supporting said image projecting means on the device, and control means operably connecting said image projecting means with the occluding means for moving the image projecting means into said line of vision when test targets are viewable at one of said locations and for moving said infinity projecting means out of the line of vision when the test targets are not viewable at said location.

7. An eye testing device of the character described, comprising a support having locating means adjacent one end thereof for locating the eyes of an individual at a given viewing position and a carrier member spaced from and located to be viewed by the eyes when at said viewing position, said carrier member having test targets positioned thereon, movable occluding means on the device for causing the test targets on said carrier member to become alternately visible at a pair of spaced locations lying in a plane substantially normal to the line of vision of the eyes when viewing the test targets, means positionable into said line of vision for projecting an image of the targets to infinity, said targets being positioned for near vision when the image projecting means are not in said line of vision, mounting means movably supporting the image projecting means on the device, and control means operably connecting said image projecting means with the occluding means for moving the image projecting means into said line of vision when test targets are viewable at one of said locations and for moving said image projecting means out of the line of vision when the test targets are not viewable at said location.

8. An eye testing device of the character described, comprising a hollow chamber having sight openings adjacent one end and a carrier member spaced from and located to be viewed through said sight openings, said carrier member having test targets positioned thereon, movable occluding means on the device for causing the test targets on said carrier member to become alternately visible at a pair of spaced locations lying in a plane substantially normal to the line of vision of an individual's eyes when positioned at the sight openings and viewing the test targets, means for projecting an image of the targets to infinity when positioned into said line of vision, said target means being positioned for near vision when the image projecting means are not in said line of vision, mounting means movably supporting the image projecting means on the device, and control means operably connecting said image projecting means with the occluding means for moving the image projecting means into said line of vision when test targets are viewable at one of said locations and for moving said image projecting means out of the line of vision when the test targets are not viewable at said location.

9. An eye testing device of the character described, comprising a pair of polarizing lenses, one having its axis disposed substantially normal to the axis of the other, a carrier member spaced from the polarizing lenses and located to be in the line of vision of the individual's eyes under test when said individual is viewing the carrier member through said polarizing lenses, said carrier member having test targets embodying portions having their axis of polarization disposed parallel to the axis of one of said polarizing lenses and having other portions whose axis of polarizing action is disposed substantially parallel to the axis of the other polarizing lens, movable occluding means on the device for causing the test targets on said carrier member to become alternately visible at a pair of spaced locations lying in a plane substantially normal to said line of vision, means positionable into said line of vision for projecting an image of said targets to infinity, said targets being positioned for near vision when the image projecting means are not in said line of vision, mounting means for movably supporting said image projecting means on the device, and control means operably connecting said image projecting means with the occluding means for moving the image projecting means into said line of vision when test targets are viewable at one of said locations and for moving said image projecting means out of the line of vision when the test targets are not viewable at said location.

10. An eye testing device of the character described comprising a support having locating means thereon for locating the eyes of an individual under test at a given viewing position, means for causing test targets to become alternately visible at a pair of locations spaced from said viewing position and with said locations lying in a plane disposed substantially normal to the line of vision of the eyes of said individuals when directed toward said test targets from said viewing position, means positionable in said line of vision for projecting an image of the test targets to infinity, said test targets being positioned for near vision when said image projecting means are not positioned in said line of vision, mounting means movably supporting said image projecting means on the support, and control means operably connecting said image projecting means with the means for causing test targets to become alternately visible, said control means moving the image projecting means into said line of vision when test targets are caused to be visible at one of said locations and moving said image projecting means out of said line of vision when test targets are caused to be visible at the other of said locations.

CHARLES A. ELLIS.

REFERENCES CITED

The following references are of record in the file of this patent:

UNITED STATES PATENTS

| Number | Name | Date |
| --- | --- | --- |
| 1,003,094 | Eastman | Sept. 12, 1911 |
| 1,417,283 | Sloan | May 23, 1922 |
| 1,454,774 | Tillyer | May 8, 1923 |
| 1,526,781 | Ferree et al. | Feb. 17, 1925 |
| 1,949,067 | Wheelock et al. | Feb. 27, 1934 |
| 1,953,268 | Scott | Apr. 3, 1934 |
| 2,206,303 | Neumueller et al. | July 2, 1940 |
| 2,238,207 | Ames, Jr. et al. | Apr. 15, 1941 |
| 2,294,787 | Leland | Sept. 1, 1942 |
| 2,362,588 | Shepard | Nov. 14, 1944 |
| 2,364,793 | Jobe et al. | Dec. 12, 1944 |
| 2,394,711 | Miesegaes | Feb. 12, 1946 |

FOREIGN PATENTS

| Number | Country | Date |
| --- | --- | --- |
| 386,733 | France | Apr. 17, 1908 |
| 199,219 | Great Britain | June 21, 1923 |